Patented Feb. 24, 1953

2,629,494

UNITED STATES PATENT OFFICE 2,629,494

CONCENTRATION OF OXIDIZED IRON ORES BY FROTH FLOTATION IN THE PRESENCE OF CARBOHYDRATE XANTHATES

Earl H. Brown, Hibbing, Minn., assignor to Attapulgus Minerals & Chemicals Corporation, a corporation of Maryland No Drawing. Application November 8, 1951, Serial No. 255,522

5 Claims. (Cl. 209—166)

This invention relates to the concentration of finely-divided oxidized iron ores, and particularly to the concentration of low-grade iron ores in which the iron is present as one of the several oxides of iron or as the carbonate of iron, and in which the gangue is principally silica or quartz. The methods of the invention are particularly useful in connection with the concentration of the oxides of iron in the tailings from an iron ore washing plant, or in taconite ore which is a ferruginous chert consisting largely of hematite and quartz, found in the western end of the Mesabi Range in the State of Minnesota.

The present invention is the result of the discovery that a xanthate of the carbohydrate from the group of carbohydrates consisting of starch, cellulose and dextrin may be used advantageously with a cationic amine compound which is a selective collector for the quartz, in the conditioning of an aqueous pulp of a finely-divided oxidized iron ore prior to subjecting such conditioned pulp to a froth-flotation treatment which results in producing a froth-product containing most of the quartz in the ore and a residue which is an oxidized iron concentrate.

In practicing the invention, the xanthates of the carbohydrates employed are produced by the chemical reaction of starch or cellulose or dextrin with carbon disulfide and a sodium or potassium hydroxide solution in the ways, for example, here inafter described. Such xanthates may be used in their impure as well as in their purer forms, a fact which makes them particularly useful in the economical practicing of the invention.

The cationic amine compounds which are employed in practicing the invention as selective collectors for the quartz may be of various well-known kinds, for example, amine acetates containing from 8 to 18 carbon atoms, such as those mentioned in the following examples of the successful practicing of the invention.

Example 1

This example describes the practicing of the invention on a taconite ore, using a sodium starch xanthate, a tetradecyl amine acetate made (in the usual way) from a tetradecyl amine sold by Armour & Co. under the name "Armeen 14-D," and a suitable frother such as pine oil.

The sodium starch xanthate employed was prepared in the following way: To 10.8 grams of potato starch were added 25 grams of carbon disulfide to make a thin slurry. To this slurry in a stoppered bottle 50 cubic centimeters of a 16% sodium hydroxide solution were quickly added, and the bottle was rotated at room temperature for 5 hours. This produced an orange-yellow gummy mass which was removed from the bottle, and the large excess of carbon disulfide was poured off. More of the carbon disulfide was then removed from the gummy mass by suction. The product thus obtained was dissolved in cold water, and the xanthate was precipitated in denatured alcohol. The gummy precipitate thus obtained was washed several times with alcohol, and finally with ether. After air-drying at room temperature, the precipitate was broken up in a mortar to a fine canary-yellow powder which was the desired sodium starch xanthate.

A 500 gram charge of minus 20 mesh taconite ore from the western end of the Mesabi Range was ground in an aqueous pulp in a laboratory rod mill until all of the pulp passed a 100 mesh screen. The feed thus obtained was then conditioned with the following reagents: Sodium starch xanthate (above mentioned) 0.8 lb.; tetradecyl amine acetate (above described) 0.3 lb. which was added in stages; pine oil (sold by Hercules Powder Co. under the name "Yarmor F") 0.04 lb.; all per ton of solids in the feed. The thus conditioned pulp, which had a pH value of 8.2, was then subjected to froth-flotation treatment at about 10% solids, thereby producing a rougher froth-product high in silica, and a machine-discharge containing most of the oxidized iron minerals. The metallurgical results were as follows:

| Products | Percent Wt. | Percent Fe | Percent SiO$_2$ | Percent Fe Recovery |
|---|---|---|---|---|
| Feed | 100.0 | 34.80 | | 100.0 |
| Froth-Product | 56.8 | 17.17 | | 28.0 |
| Machine Discharge | 43.2 | 57.97 | 11.23 | 72.0 |

Example 2

This example describes the practicing of the invention on a taconite ore, using a sodium starch xanthate, and a hexadecyl-octadecyl-octadecenylamine acetate made (in the usual way) from hexadecyl, octadecyl and octadecenyl amines sold by Armour & Co. under the name "Armeen T."

The sodium starch xanthate employed was prepared in the following manner: To 20.1 grams of a commercial corn-starch, 3.6 grams of sodium hydroxide was added as a 1% solution in an open beaker with constant stirring. After a few minutes 1.3 grams of carbon disulfide was added and the stirring was continued for about 2 hours. This reaction product containing sodium starch xanthate was used in making a 2.5% aqueous solution, based on the weight of the chemicals entering the reaction.

The feed to the flotation operation was 500 grams of minus 20 mesh taconite ore from the west end of the Mesabi Range, which was ground in an aqueous pulp in a laboratory rod mill until all the pulp passed a 100 mesh screen. The feed thus obtained was conditioned with the following reagents: Sodium starch xanthate (above described) 0.8 lb.; hexadecyl-octadecyl-octadecenyl amine acetate (above mentioned) 0.55 lb. which was added in stages; as a frother, equal parts of amyl and methyl alcohol 0.14 lb.; all per ton of solids in the feed. The thus conditioned pulp, which had a pH value of 8.2 was then subjected to froth-flotation treatment at about 10% solids, thereby producing a rougher froth-product high in silica, and a machine-discharge containing most of the oxidized iron minerals. The metallurgical results were as follows:

| Products | Percent Wt. | Percent Fe | Percent SiO₂ | Percent Recovery ||
|---|---|---|---|---|---|
| | | | | Fe | SiO₂ |
| Feed | 100.0 | 39.30 | 40.23 | 100.0 | 100.0 |
| Froth Product | 50.6 | 17.80 | 70.08 | 22.9 | 88.1 |
| Machine Discharge | 49.4 | 61.06 | 7.81 | 77.1 | 11.9 |

*Example 3*

This example describes the practicing of the invention on a taconite ore, using a sodium starch xanthate, and a rosin amine acetate obtained from Hercules Powder Co. under the name "Rosin Amine D Acetate."

The sodium starch xanthate employed was prepared in the manner described in Example 2.

A 500 gram feed was prepared as described in Example 2; and this feed was conditioned with the following reagents: Sodium starch xanthate (above mentioned) 0.8 lb.; rosin amine acetate (above mentioned) 0.5 lb. which was added in stages; as a frother, equal parts of amyl and methyl alcohol 0.14; all per ton of solids in the feed. The thus conditioned pulp which had a pH value of 8.2 was subjected to froth-flotation treatment at about 10% solids, thereby producing a rougher froth-product high in silica, and a machine-discharge product containing most of the oxidized iron minerals. The metallurgical results were as follows:

| Products | Percent Wt. | Percent Fe | Percent SiO₂ | Percent Fe Recovery |
|---|---|---|---|---|
| Feed | 100.0 | 39.12 | | 100.0 |
| Froth Product | 54.7 | 22.55 | | 31.5 |
| Machine Discharge | 45.3 | 59.12 | 10.82 | 68.5 |

*Example 4*

This example describes the practicing of the invention on a deslimed tailing from an iron ore washing plant, using a sodium starch xanthate, and a tetradecyl amine acetate made (in the usual way) from a tetradecyl amine sold by Armour & Co. under the name "Armeen 14-D."

The sodium starch xanthate employed was the same as that used in Examples 2 and 3.

The feed to the froth-flotation operation was obtained from the tailings of an iron ore washing plant, and consisted of 500 grams which after substantially complete desliming was ground in an aqueous pulp in a laboratory rod mill until practically all the pulp passed a 100 mesh screen. The feed thus obtained was conditioned with the following reagents: Sodium starch xanthate (above mentioned) 0.2 lb., tetradecyl amine acetate (above mentioned) 0.35 lb. which was added in stages; as a frother, "Yarmor F" pine oil 0.17 lb.; all per ton of solids in the feed. The thus conditioned pulp which had a pH value of 8.1 was then subjected to froth-flotation treatment at about 10% solids, thereby producing a rougher froth-product high in silica, and a machine-discharge product containing most of the oxidized iron minerals. The metallurgical results were as follows:

| Products | Percent Wt. | Percent Fe | Percent SiO₂ | Percent Fe Recovery |
|---|---|---|---|---|
| Feed | 100.0 | 33.64 | | 100.0 |
| Froth Product | 61.2 | 16.28 | | 29.6 |
| Machine Discharge | 38.8 | 61.02 | 8.51 | 70.4 |

*Example 5*

This example describes the practicing of the invention on a taconite ore, using a sodium starch xanthate, and a hexadecyl trimethyl ammonium chloride sold by Armour & Co. under the name "Arquad 16."

The sodium starch xanthate employed was the same as that employed in Examples 2, 3 and 4.

The feed was another taconite ore; and this feed was prepared in the same manner as in Example 1. This feed was conditioned with the following reagents: Sodium starch xanthate (of the kind used in Examples 2, 3 and 4) 0.8 lb.; hexadecyl-trimethyl ammonium chloride (above mentioned) 0.35 lb. which was added in stages; as a frother, "Yarmor F" pine oil 0.03 lb.; all per ton of solids in the pulp. The thus conditioned pulp which had a pH value of 8.2, was then subjected to froth-flotation treatment at about 10% solids, thereby producing a rougher froth-product high in silica, and a machine-discharge product containing most of the oxidized iron minerals. The metallurgical results were as follows:

| Products | Percent Wt. | Percent Fe | Percent SiO₂ | Percent Fe Recovery |
|---|---|---|---|---|
| Feed | 100.0 | 37.97 | | 100.0 |
| Froth Product | 61.1 | 23.31 | | 37.5 |
| Machine Discharge | 38.9 | 60.99 | 8.23 | 62.5 |

*Example 6*

This example describes the practicing of the invention on a taconite ore, using a potassium starch xanthate hereinafter described, and the tetradecyl amine acetate used in Example 1.

The potassium starch xanthate employed was prepared in the following way: To 10.8 grams of corn-starch, 25 grams of carbon disulfide were added making a thin slurry. To this slurry, in a stoppered bottle, 50 c. c. of a 20 per cent potassium hydroxide solution were quickly added and the bottle rotated for five hours. The gummy mass was removed from the bottle and the large excess of carbon disulfide poured off. More of the carbon disulfide was then removed by suction. The product was dissolved in cold water and then poured slowly into cold denatured ethyl alcohol which precipitated the starch xanthate. The precipitate was washed several times with alcohol and finally with ether. After air drying at room temperature for two hours, the xanthate was ground in a mortar to a fine greenish-yellow powder which was soluble in water.

The feed to the froth-flotation operation was a minus 100 mesh taconite ore which was prepared in the manner described in Example 1. This feed was conditioned with the following reagents: Potassium starch xanthate (above described) 1.0 lb.; tetradecyl amine acetate (above mentioned) 0.3 lb. which was added in stages; "Yarmor F" pine oil 0.04 lb.; all per ton of solids in the feed. The thus conditioned feed which had a pH value of 8.2 was subjected to froth-flotation treatment, thereby producing a rougher froth-product high in silica, and a machine-discharge product containing most of the iron minerals. The metallurgical results were as follows:

| Products | Percent Wt. | Percent Fe | Percent SiO$_2$ | Percent Fe Recovery |
|---|---|---|---|---|
| Feed | 100.0 | 35.01 | 43.70 | 100.0 |
| Froth Product | 61.0 | 19.44 | | 33.9 |
| Machine Discharge | 39.0 | 59.37 | 8.24 | 66.1 |

*Example 7*

This example describes the practicing of the invention on a taconite ore, using a sodium dextrin xanthate hereinafter described, and the tetradecyl amine acetate used in Example 1.

The sodium dextrin xanthate employed was prepared in the following way: 10.8 grams of a commercial dextrin were dissolved in 180 c. c. of a 2 per cent sodium hydroxide solution. To this solution in an open beaker, 7.6 grams of carbon disulfide were added and the solution mechanically stirred for three hours. The solution was then slowly poured into methyl alcohol which precipitated the xanthate. The precipitate was washed several times with alcohol and finally with ether.

The taconite ore feed was the same as that described in Example 1. This feed was conditioned with the following reagents: Sodium dextrin xanthate (above described) 1.7 lbs.; tetradecyl amine acetate (above mentioned) 0.35 lb. which was added in stages; "Yarmor F" pine oil 0.04 lb.; all per ton of solids in the feed. The thus conditioned pulp which had a pH value of 8.0 was subjected to froth-flotation treatment at about 10% solids, thereby producing a rougher froth-product high in silica, and a machine-discharge product containing most of the iron minerals. The metallurgical results were as follows:

| Products | Percent Wt. | Percent Fe | Percent SiO$_2$ | Percent Fe Recovery |
|---|---|---|---|---|
| Feed | 100.0 | 35.00 | | 100.0 |
| Froth Product | 54.6 | 14.74 | | 23.0 |
| Machine Discharge | 45.4 | 59.36 | 10.00 | 77.0 |

*Example 8*

This example describes the practicing of the invention on a taconite ore, using a sodium cellulose xanthate hereinafter described, and the tetradecyl amine acetate used in Example 1.

The sodium cellulose xanthate was prepared in the following way: 10 grams of cotton linter were soaked for seven hours in 250 c. c. of an 18.0 per cent sodium hydroxide solution. Excess caustic solution was drained off and the cotton pressed until the weight was 40 grams. The cotton was then shredded and placed in a stoppered bottle with 7.6 grams of carbon disulfide and rotated for 11 hours. The gummy mass was removed from the bottle and dissolved in water, making an orange-colored solution; and part of this aqueous solution was slowly poured into cold denatured ethyl alcohol which precipitated the sodium cellulose xanthate. The precipitate was filtered, washed with alcohol and finally with ether. The xanthate was air dried at room temperature and then ground in a mortar to a fine yellow powder which was soluble in water.

The feed to the flotation operation was the same as the feed in Example 1. This feed was conditioned in an aqueous pulp with the following reagents: Sodium cellulose xanthate (above described) 0.8 lb.; tetradecyl amine acetate (above mentioned) 0.3 which was added in stages; "Yarmor F" pine oil 0.17 lb.; all per ton of solids in the feed. This conditioned pulp which had a pH value of 8.3 was subjected to froth-flotation treatment at about 10% solids, thereby producing a rougher froth-product high in silica, and a machine-discharge product containing most of the iron minerals. The metallurgical results were as follows:

| Products | Percent Wt. | Percent Fe | Percent SiO$_2$ | Percent Fe Recovery |
|---|---|---|---|---|
| Feed | 100.0 | 35.20 | | 100.0 |
| Froth Product | 65.6 | 22.74 | | 42.4 |
| Machine Discharge | 34.4 | 58.95 | 9.99 | 57.6 |

It will be understood that the metallurgical results given in the various foregoing examples might have been improved as regards recovery by a cleaning operation; but it is obvious that the results reported show the successful practicing of the invention.

What is claimed is:

1. The method of concentrating finely divided oxidized iron ores containing a siliceous gangue, which comprises conditioning an aqueous pulp of the ore with a xanthate of a carbohydrate from the group of carbohydrates consisting of starch, cellulose and dextrin, and with a cationic amine compound which is a selective collector for the siliceous gangue, and subjecting the conditioned pulp to froth-flotation treatment, thereby producing a froth-product containing most of the siliceous material in the ore and a residue which is an oxidized iron concentrate.

2. The method according to claim 1, employing a sodium starch xanthate.

3. The method according to claim 1, employing potassium starch xanthate.

4. The method according to claim 1, employing sodium cellulose xanthate.

5. The method according to claim 1, employing sodium dextrin xanthate.

EARL H. BROWN.

REFERENCES CITED

The following references are of record in the file of this patent:

UNITED STATES PATENTS

| Number | Name | Date |
|---|---|---|
| 2,388,471 | De Vaney | Nov. 6, 1945 |
| 2,483,890 | De Vaney | Oct. 4, 1949 |